United States Patent [19]

Lüber

[11] Patent Number: 5,146,714

[45] Date of Patent: Sep. 15, 1992

[54] PROCESS AND ARRANGEMENT FOR REMOVING EXCESS MATERIAL FROM CASTINGS

[76] Inventor: Werner Lüber, Bahnhofstr. 23/32, CH-9602 Bazenheid, Switzerland

[21] Appl. No.: 434,677

[22] PCT Filed: Mar. 8, 1989

[86] PCT No.: PCT/CH89/00040

§ 371 Date: Oct. 25, 1989

§ 102(e) Date: Oct. 25, 1989

[87] PCT Pub. No.: WO89/08523

PCT Pub. Date: Sep. 21, 1989

[30] Foreign Application Priority Data

Mar. 9, 1988 [CH] Switzerland ............... 880/88

[51] Int. Cl.$^5$ .................. B24B 9/00; B24B 51/00
[52] U.S. Cl. .................. 51/165.71; 51/281 R; 51/165.75; 51/165.9; 51/340; 901/22; 901/41
[58] Field of Search ............... 51/281 R, 34 C, 34 D, 51/35, 47, 165.71, 165.75, 165.92; 901/16, 22, 41

[56] References Cited

U.S. PATENT DOCUMENTS

| | | | |
|---|---|---|---|
| 3,923,086 | 12/1975 | Spohn, Jr. | 144/134 B |
| 4,123,877 | 11/1978 | Pere | 51/47 |
| 4,378,959 | 4/1983 | Susnjara | 901/22 |
| 4,694,230 | 9/1987 | Slocum et al. | 901/22 |
| 4,753,048 | 6/1988 | Asada | 51/281 R |
| 4,894,597 | 1/1990 | Ohtomi | 901/41 |

FOREIGN PATENT DOCUMENTS

| | | |
|---|---|---|
| 2352945 | 4/1975 | Fed. Rep. of Germany ........ 901/22 |
| 3627560 | 2/1988 | Fed. Rep. of Germany . |
| 2509648 | 1/1983 | France . |
| 0788064 | 12/1957 | United Kingdom . |

OTHER PUBLICATIONS

Quicker, and Safer Abrasive Cut-Off; Machinery and Production Engineering; Oct. 1987 Horton Kirby, Kent, Great Britain.

*Primary Examiner*—Robert A. Rose
*Attorney, Agent, or Firm*—Herbert Dubno; Andrew Wilford

[57] ABSTRACT

A cut-off arrangement comprises a multiple-arm industrial robot (100) with a support arm in the form of an articulated lever (7). One end of the lever is mounted in a stanchion (8) so as to pivot about a horizontal and a vertical axis. The workpiece holder (18), on which the cutting-off disk (13) moves linearly on sliding means (22, 23), is hingedly supported at the other end of the lever. The adjusting devices of the robot (100) are hydraulic cylinders (11; 16; 17; 19) or hydraulic servomotors (20, 21) which can be centrally controlled and immobilized.

6 Claims, 2 Drawing Sheets

PROCESS AND ARRANGEMENT FOR REMOVING EXCESS MATERIAL FROM CASTINGS

CROSS REFERENCE TO RELATED APPLICATION

This application is a national phase of PCT/CH89/00040 filed Mar. 8, 1989 and based in turn, on Swiss national application 880/88-7 filed Mar. 9, 1988 under the International Convention.

FIELD OF THE INVENTION

The present invention relates to an arrangement for cutting off excess material from castings, by means of a rotating abrasive cutting-off disk or the like, which is arranged at the free end of a multiple-arm industrial robot, via its tool holder, so that the abrasive cutting-off disk can be applied to the preestablished point of the casting.

BACKGROUND OF THE INVENTION

A considerable problem in such processes is the behavioral instability of all parts of the robot, which are in mobile interaction, so that an accurate removal of the excess material, particularly from large pieces of castings, could not be achieved in practice. U-p to now, for this reason, all machines available for this process could no be used on an industrial scale, and were abandoned in the experimental stage.

OBJECTS OF THE INVENTION

It is therefore the principal object to the present invention to provide a process for removing excess material flow casting avoiding the aforementioned drawbacks.

Another object of the present invention is to provide an arrangement for carrying out the process.

SUMMARY OF THE INVENTION

According to the invention, this is achieved due to the fact that the abrasive cutting-off disk is slidably guided a the tool holder in a linear advance direction, whereby the advance takes place as soon as the abrasive cutting-off disk is positioned at the preestablished point of the casting by adjusting means of the robot and all adjusting devices to the robot are immobilized in a rigid junction.

In tis way, since only the abrasive cutting-off disk has a linear advancement and all other adjusting devices are in a state of rigid junction, vibrations transmitted to the adjusting devices cannot have a negative effect, not even on the linear advance of the abrasive cutting-off disk, since the mentioned vibrations are strongly damped on the way to the foundation.

Correspondingly, the present invention relates to an arrangement for carrying out the process, which is characterized by a multiple-arm robot with a support arm in the form of an articulated lever, which at one end is supported in a stand so that it can swing about a horizontal and a vertical axis, and at the other end hingedly carries the tool holder which supports the abrasive cut-off disk, which advances linearly thereon via sliding means, whereby the adjusting means of the robot are hydraulic cylinders or hydraulic servomotors which can be centrally controlled and locked in position.

The construction to the support arm as a horizontally and vertically swingable articulated lever confers to the cutting tool a wide radius of action. The hinged arrangement of the cutting tool at the end of the articulated lever makes possible in a simple way the advancement of the tool in various spatial planes. The hydraulic cylinder for opening and closing the articulated lever allows an accurate positioning over a suitable control device and in addition a rigid locking in position during the finishing process.

Preferably the articulated lever is so supported in the stand, that the latter has a turntable whereon a bearing bed, swingable about a vertical axis, is supported, that in the bearing bed the articulated lever is supported swingably about a horizontal axis. For the pivoting of the bearing bed in the stand on the one hand, and of the articulated lever in the bearing bed, on the other hand, preferably also hydraulic cylinders are used.

The hinged fastening to the cutting tool can be particularly advantageous, when at the end of the free potion of the articulated lever it is fastened to a tool holder, which is swingably supported so that ti can pivot about three rotational axes which are perpendicular with respect to each other, a first of these axes running horizontally through the end of the articulated lever. Due to this arrangement, the cutting tool can be easily brought into a variety of the inclined positions. Thereby, the first axis of rotation runs always horizontally around the end of the articulated lever. This however can be pivoted in turn on the stand about the vertical axis at various height levels and radii. For the actuation of the tool holder hydraulic drives, such as hydraulic cylinders or servomotors can be used.

The cutting tool is preferably fastened to a sliding means, which is linearly slidable in a slide guide on eh tool holder, By contrast with the known devices, this arrangement ensures that during the finishing of the workpiece, the support arm does not have to be pivoted at all. Moreover, for a certain series of workpieces, the support arm need be once set in the correct position, after which the subsequent finishing is primarily done due to the advance of the sliding carriage, optionally in combination with the pivoting of the tool holder on the articulated lever. Preferably, the linear advancement of the cutting tool is also performed hydraulically. However, it si also conceivable to have a manual advancement of the slide carriage, for instance by means of a threaded spindle.

For the finishing of castings, the preferred cutting tool would be a hydraulically actuable abrasive cutting-off tool. However, for other uses, the cutting device can be equipped with alternate cutting tools. So, for instance, a circular-saw blade actuated by an electric motor can be used. In certain cases, it may be advantageous to insert vibratory cutting-off bits to the like.

A particularly advantageous actuation of the a device can be achieved with a mobile switchboard with servo elements which are operationally connected through cables and remote-control devices with the cutting-off device for tool control. The operator can thereby undertake the necessary manipulations right there next to the workpiece and survey the workpiece at the same time. Advantageously, the servo elements comprise at least one outwardly extending control stick of triggering swinging-and/or rotating motions. With the control stick (joystick), at least one hand is always in operating position on the control box, so that certain functions can be performed also without visual contact. The operator can in this way keep the workpiece under continuous surveillance, while performing the most important manipulations.

Depending on the material of the workpieces to be finished, the cutting-off disks can be subjected to relatively intense wear. In order to avoid a continuous rechecking to the cutting-off wheel, in the plane of the cutting-off disk, a measuring sensor connectable to a measuring device is provided, which can be lowered onto the cutting-off disk, in order to find out its diameter. With the said to the measuring sensor, when the machine is stopped, it can be established at any time whether the diameter of the cutting-off disk is still sufficient. It is particularly advantageous when the measuring device is operatively connected with a control device for the control of the hydraulic motor driving the cutting-off disk. This way, the rotational speed to the hydraulic motor can be controlled depending on the determined diameter of the cutting-off disk.

The cutting-off device is preferably provided with a programmable control device, so that certain courses of motion to the cutting-off tool are programmable, respectively can be repeated. It is preferable to proceed according to the Teach-in process.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

Figure 1:
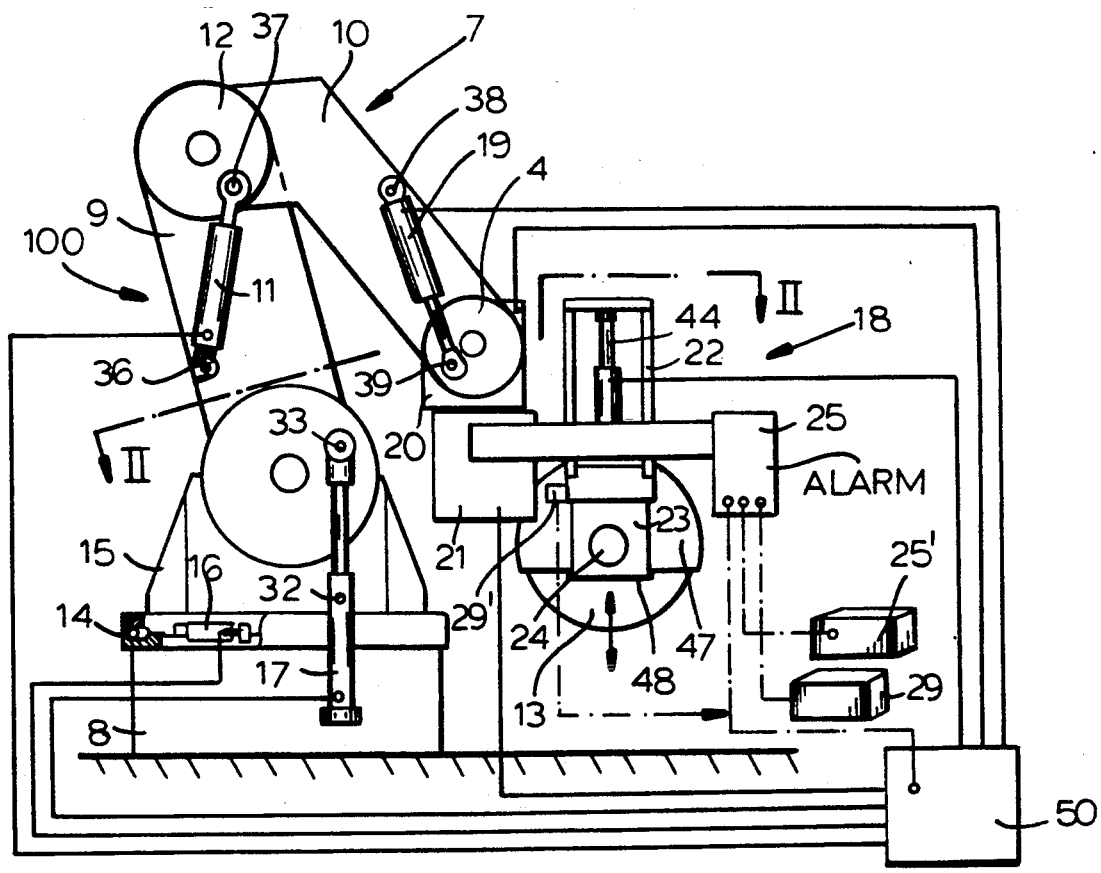
FIG. 1 is a partially sectional side view to the cutting-off arrangement according to the invention.
Figure 2:
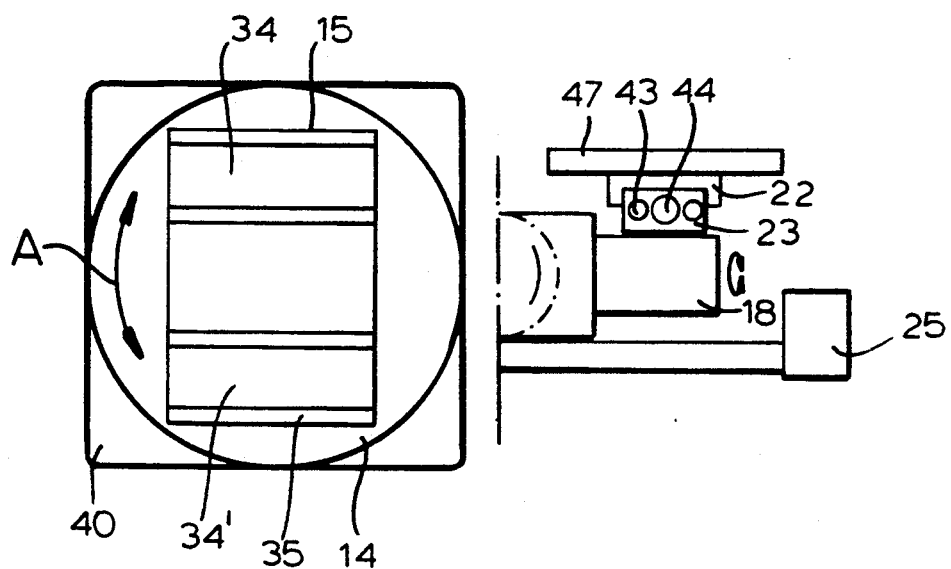
FIG. 2 is a sectional view along line II—II in FIG. 1.
Figure 3:
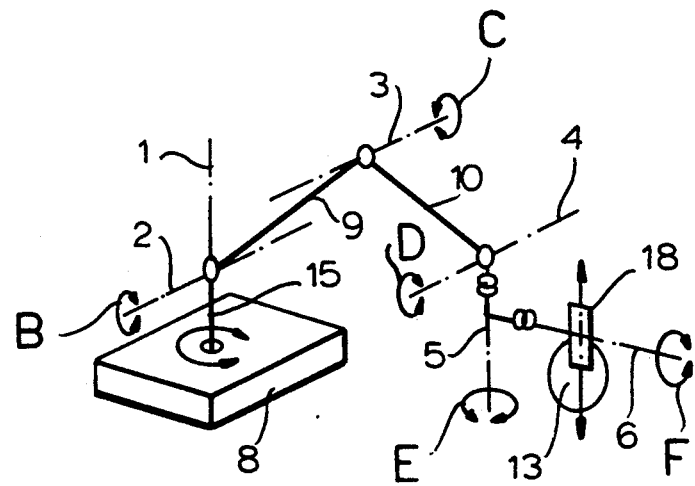
FIG. 3 is a perspective view of a motion pattern with the various rotational axes of the arrangement, according to FIGS. 1 and 2.

The construction and the function of the illustrated embodiment can be seen from FIGS. 1 to 3. The articulated lever 7 is supported to be multiply pivotable in a stand 8, whereby in the present case the stand is positioned directly on the floor. The articulated lever 7 consists thereby of a portion 9 on the stand side and of a free portion 10. Both portions are mutually pivotable about the articulated-lever joint 12.

On the stand 8, a turntable 14 is provided, which carries a bearing bed 15, pivotable about a vertical axis 1 (FIG. 3). By actuating one or more hydraulic cylinders 16, the bearing bed 15 can be pivoted about the vertical axis 1, in direction of the arrow A.

IN the bearing bed 15, the stand-side portion 9 of the articulated lever 7 is supported, pivotable about a horizontal axis 2 in the direction of arrow B (FIG. 3). As can be seen from FIG. 2, the bearing bed 15 has a flask-like construction, so that two hollow spaces 34 and 34' and formed. These hollow spaces are closed towards the outside by covers 35. In the hollow spaces, the two hydraulic cylinders 17 are arranged, which are fastened to the bearing bed 15, being pivotable around the cylinder articulations 32. The lower part of theses hydraulic cylinders reaches into the hollow space of the stand 8, where an unhindered motion is insured. The piston rods of the hydraulic cylinders 17 are linked to the piston articulations 33 on the stand-side portions 9 f the articulated lever 7.

For the actuation to the articulated lever, inside the stand-side portion 9, two hydraulic cylinders 11 are provided, only one of them being shown in FIG. 1. These hydraulic cylinders are hingedly fastened to the cylinder articulations 36 on the lower portion 9. The piston rods f these hydraulic cylinders are linked to the piston articulations 37 on the free portion 10 of the articulated lever 7. By actuating the hydraulic cylinder 1, the free portion 10 is pivotable about the axis 3 is the direction of the arrow C (FIG. 3).

At the end of the free portion 10, a tool holder 18 can swivel around three mutually perpendicular axes. A first axis 4 runs thereby horizontally through the end of the articulated lever. For the rotating motion around this axis, on the free portion 10, a hydraulic cylinder 19 is linked to the cylinder articulation 38. The piston rod to this hydraulic cylinder is linked to the piston articulation 39 on a housing segment of the tool holder 18. An actuation to the hydraulic cylinder 19 triggers a rotation around the horizontal axis 4, in the direction of arrow D (FIG. 3).

The tool holder can also be pivoted in the direction of arrow E around an axis 5, which is arranged at a right angle to the horizontal axis 4. For this rotating motion, a hydraulic servo motor 20 is used. Finally, the tool holder can also be swung i the direction of arrow F about the axis 6, which is arranged at a right angle to the axis 5. The articulated lever can be pivoted by a total of 90° around the axis 1 on the stand 8. The tool holder is rotatable by 180° around the axis 5, so that various points of the workpiece are accessible, without moving the articulated lever. Further, an inclined position of the abrasive cutting-off disk 13 about the axis 6 can e seen. The abrasive cutting-off disk can be pivoted by the tool holder so that it practically comes to lie horizontally.

The abrasive cutting-off disk 13 is coaxially mounted on a hydraulic motor 24 and mounted together therewith on a sliding carriage 22. The carriage has guide rods 43, which are supported linearly displaceable in slide-carriage guides 23. The slide-carriage guides 23 are rigidly connected with the tool holder 18. Between the two parallel guide rods 43, a hydraulic cylinder 44 is mounted for the advance of the sliding carriage 22. The cylinder articulation is fastened to the carriage and the piston articulation is fastened to the tool holder (not shown). For safety reasons, over the cutting-off disk 13, a tool guard 47 is mounted, which can partially be flipped open of the replacement to the cutting-of disk.

In certain cases it is necessary to prevent a tipping of the cut-off excess material in the direction of the tool. For this purpose, a special release mechanism 48 si mounted on the sliding carriage 22. This mechanism is not described in detail and it consists of parallel guide rods which at their end are connected to each other in a yoke-like fashion. The guide rods are slidable in guides mounted on the sliding carriage 22, in a direction parallel to the advance plane of the cutting-off disk. The advance of the release mechanism 48 takes place with tepid of an actuation device, which is affixed to the sliding carriage 22 between the guide rods and which engages the upper yoke. The actuation device can be for instance a hydraulic cylinder or a pneumatic cylinder. During the removal of excess material from a casting, particularly when the cutting-off disk 13 is in a horizontal position, the release mechanism is extended and consistency pressed against the excess material, with a certain pressure force. This pressing force is sufficient to keep open the cutting gap, so that the abrasive cutting-off wheel does not get stuck. Shortly before the complete removal, the excess material e.g. a riser, is pushed away at the still remaining material web, due to the pressure force. In this way, a damaging of the tool due to tipped over excess material is prevented.

IN this arrangement, in the plane of the abrasive cutting-off disk 13, on the shielded side h e cutting-off wheel, a measuring sensor can be provided as is known per se and therefore not described in greater detail. The sensor can e lowered onto the edge of the cutting-off disk 13 by suitable actuation means, e.g. pneumatically. The measuring sensor is connected with a measuring device not shown in the drawing, which is also arranged on the sliding carriage 22. This measuring device can be for instance an incremental length measuring system of known construction. It measures the linear displacement of the measuring sensor up to its contact wi the abrasive cutting-off wheel 13, electrically, electronically, optically or even mechanically. With the air of this length measurement, obviously the diameter of the cutting-off wheel 13 which is subjected to a relative strong wear, can be established.

The measuring device 29 can deliver its measuring impulses to a control device, which is into described in detail, and which control the hydraulic motor 24 so that it works always with an optimal cutting speed.

The actuation device for the lowering of the measuring sensor can be coupled with the hydraulic motor 24 so that is is closed when the motor is running, in order to avoid damage to the measuring sensor. When the motor stops, the measuring sensor can e lowered, so ah the correct cutting speed is continuously set. Means can be provided to automatically lower the sensor each time the hydraulic motor 24 stops. The respective diameter to the cutting-off disk could for instance be optically displaced on a luminous display. When the diameter of the cutting-off disk is no longer sufficient, for instance an optical and/or acoustical alarm signal could be activated.

The control of the entire arrangement or the positioning of the tool holder 18 and the advance to the tool takes place via a switch board 25.

However in addition thereto or instead of it, a mobile switch board 25' can also be provided. It is also possible to provide a radio remote-control system, or an ultrasound remote-control. The mobile switchboard confers a higher degree of mobility onto the operator, enabling him at the same time to optimally survey the cutting-off process.

In accordance wi the invention, the switching is set up so that with the actuation of the advance of the abrasive cutting-off disk 13 via the hydraulic cylinder 44, all the remaining hydraulic adjusting devices 11, 16, 17, 19, 20 which are in working connection with the hydraulic control 50 via corresponding liens, are brought to a state of rigid junction, in order to impart to the entire arrangement a rigid, relatively insensitive characteristic.

I claim:

1. An apparatus for removing excess material from a casting, comprising:
    a rotating abrasive cut-off disk;
    a tool holder carrying said abrasive cut-off disk and provided with means enabling linear advance of said cut-off disk relative to said casting on said tool holder to remove excess material from said casting;
    a multiple-arm industrial orbit carrying said tool holder at a free end of said multiple-arm industrial robot, said multiple-arm industrial robot having a multiplicity of mutually displaceable angularly adjustable parts enabling positioning of said tool holder at a predetermined location adjacent said casting; and
    centrally control and lockable hydraulic actuators between said parts whereby all of said mutually displaceable angularly adjustable parts can be rigidly locked relative to one another under central control upon positioning of said tool holder at said predetermined location for subsequent linear displacement of said cut-of disk relative to si casting on said tool holder to remove said excess material, said multiple-arm industrial robot having a stand pivotable about a vertical axis relative to a stationary support and forming one pair of said mutually displaceable angularly adjustable parts, an articulated leer supported on said stand and pivotable about a horizontal axis and forming with said stand at least one other pair of said mutually displaceable angularly adjustable parts, said tool holder forming with said leer another pair of said mutually displaceable angularly adjustable parts.

2. The apparatus defined in claim 1 wherein said articulated lever comprises a stand side portion pivotally connected to aid stand and a free portion pivotally connected to said stand side portions at least one hydraulic cylinder being provided between said portions, at leas tone hydraulic cylinder being provided between said stand side portion and said free portion and articulated to both said stand side portion and said free portion.

3. The apparatus defined in claim 2 wherein said tool holder is rotatbly supported at an end of said free portion so as to be pivotable about three mutually perpendicular axes, a first of said mutually perpendicular axes extending horizontally through said end of said free portion.

4. The apparatus defined in claim 3 further comprising at least one hydraulic cylinder connected to said tool holder and said free portion for rotating said holder about said first axis.

5. The apparatus defined in claim 4 wherein hydraulic servomotors are provided to rotate said tool holder bout respective others of said mutually perpendicular taxes.

6. The apparatus defined in claim 5 further comprising a hydraulic motor connected to said disk or driving same.

* * * * *